(12) United States Patent
Jas

(10) Patent No.: US 6,694,325 B2
(45) Date of Patent: Feb. 17, 2004

(54) DATABASE METHOD IMPLEMENTING ATTRIBUTE REFINEMENT MODEL

(76) Inventor: Frank Jas, P.O. Box 7935, Santa Cruz, CA (US) 95061

(*) Notice: Subject to any disclaimer, the term of this patent is extended or adjusted under 35 U.S.C. 154(b) by 62 days.

(21) Appl. No.: 09/682,754

(22) Filed: Oct. 14, 2001

(65) Prior Publication Data

US 2002/0059260 A1 May 16, 2002

Related U.S. Application Data

(60) Provisional application No. 60/240,639, filed on Oct. 16, 2000.

(51) Int. Cl.[7] .............................................. G06F 17/30
(52) U.S. Cl. ...................................................... 707/102
(58) Field of Search ......................... 707/100, 2, 104.1, 707/10, 102

(56) References Cited

U.S. PATENT DOCUMENTS 5,485,610 A * 1/1996 Gioielli et al. .............. 707/102
5,933,831 A * 8/1999 Jorgensen .................... 707/100
6,502,088 B1 * 12/2002 Gajda et al. .................. 707/2

* cited by examiner

Primary Examiner—Safet Metjahic
Assistant Examiner—Sana Al-Hashemi
(74) Attorney, Agent, or Firm—Mark P. White

(57) ABSTRACT

A computer-based software method for creating and modifying a data base which contains a multiplicity of records consisting of attribute records, entity records, and constraint records. Each entity record contains a unique identifier and a list of pairs of attribute identifiers and associated values. Each constraint record contains a statement which evaluates to true or false when applied to an entity record in the database. The result is a database in which attribute, constraint, and entity records may be modified without having to reload parts of or the entire database. In addition, the invention contains an integrated method of data compacting and indexing, implemented by component packets, containing component data records, component description records arranged in an array, and a header record. Component data records may contain index structures, which in turn may contain other component packets. Data packets are transferred between an applications program and the database.

10 Claims, 9 Drawing Sheets

DATABASE METHOD IMPLEMENTING ATTRIBUTE REFINEMENT MODEL

BACKGROUND OF INVENTION

1. Field of the Invention

The present invention relates to, and finds utility within, computerized database definition and management. More particularly, the present invention relates to a computerized database management system implementing an Attribute-Refinement model.

2. Background Relevant to the Prior Art

A database management system (DBMS) is a computerized system that stores and manipulates data. A DBMS provides software and/or end-user interfaces for manipulating data according to one or more data models, e.g., U.S. Pat. No. 5,713,014, column 1, lines 17–18).

A data model (also called a conceptual or semantic model) is a collection of concepts that can be used to describe the data types, relationships and constraints that should hold on the data. Data models strive to capture and represent certain aspects of human perceptions of the real world so that these aspects can be incorporated into an information system, Y. Wand, pages 494–495.

Most data models are concerned with things, which are often referred to as entities, and associations among things, often referred to as relationships, see Y. Wand, et al, pg. 494–495. A thing in the real world, like a person, has properties, like age, weight, gender, which are often represented by attributes in a data model. Certain properties imply the existence of other entities. For example, the property of being employed implies the existence of an employer. Such properties are called mutual properties, and are one way of describing an association between the two things, in this case a person and an employer. In contrast, the property of weight does not imply the existence of anything else; see Y. Wand, page 498.

Common data models include: the relational model, the object model, the entity-relationship (E-R) model, and the extended entity-relationship (EE-R) model. Other data models include the network model and the hierarchical model.

The relational model was introduced by Codd (1970) and has one modeling concept, the relation, which is a two dimensional table containing data. This data model is the basis for the data definition and structured query language, SQL, which itself the basis for most commercially available DBMS's. In the relational model each row of a table corresponds to an entity and each column of the table contains the value for a particular attribute. Relationships between entities are represented by adding columns to one table that contain values uniquely identifying a row in another table. A table row, which in the relational model corresponds to an entity, is often informally called a "data record" or "record". The relational model is described at length in most database textbooks, including Elmasri, Ullman, and Date.

An object model is defined by the Object Design Language (ODL) (ODMG 3.0 pages 61–78) and is also discussed in Ullman, pages 25–77. The E-R model is defined by a graphical notation called an E-R diagram, described in Elmasri page 63 and 73–93. The EE-R model augments the E-R model with modeling concepts for super/sub class relationships and predicate defined unions of entity classes. A formal set theoretic definition of EE-R is given in Elmasri pages 92–93. The network model and hierarchical model are widely accepted to be special cases of the E-R model, and are described in Ullman, pages 77–80.

Data models are often compared on the number of modeling concepts they support and the restrictions they impose on the use of those modeling concepts. An example of a modeling concept is the table in the relational model, or an entity in the E-R model. An example of a modeling restriction is the E-R model's rule that all entities represented by a symbol at a particular location on an E-R diagram must belong to an entity type. An entity type determines the attributes the entity may have. This implies that in any E-R data model, if an entity has one of the attributes of the entity type, it must have all the attributes defined by the entity type.

In terms of modeling concepts and constraints, the object model and E-R model are considered nearly identical in the sense that every modeling concept in the object model can be duplicated by some combination of modeling concepts in the E-R model and vice versa. The EE-R model contains additional modeling concepts that match the object model concepts more directly, and some argue the EE-R model contains at least one modeling concept, the entity-union type, that cannot be easily duplicated in the object model, Elmasri, page 399.

Even though the relational model has only one modeling concept: the table, both the object and EE-R modeling concepts can by mapped to some combination of table definitions of the relational model. Chapter 9 in Elmasri and chapter 3 in Ullman cover this process in detail. Since the relational model is implemented by most commercial DBMS's, the relational model is also considered to be an implementation model. Since the object model as described by ODL is implemented by several commercial OO-DBMS's, the object model is considered to be an implementation model as well. The E-R and EE-R models are not presently known to have commercially available management systems, and therefore are not considered to be implementation models.

There are several limitations of the existing data and implementation models. One limitation of existing data and implementation models is the constraint that attributes are grouped by tables (in the relational model) or by entity types (in the E-R model). This limitation implies that if an entity has a value for one of the attributes in the group it must have values for all the attributes in the group. Take as an example a data model for a person. A person may have attributes of name, age, and weight. If a person is employed, the data model would contain attributes of employer and salary. If a person is a student, then the data model may contain attributes of school name, year in school, and study major. If we use a single table to hold all of these attributes, then each row in the table will require values for all the attributes, even if the particular row represents a person who is not a student, or a person who is not employed. In the E-R model and object models, each entity would similarly require values for all the attributes.

In these conventional models, the solution is to create three table or entity definitions, one containing the name, age, and weight, another containing employer and salary, and a third containing school name, year in school, and major. The person, employer and school tables or entity definitions would require additional link attributes that would allow an application program using the database to locate the relevant employee or student information for a particular person. One of the consequences of this limitation is the added complexity in deciding the correct partitioning of attributes into various tables or entity definitions in the conceptual model of the database, and in the added complexity of extracting and manipulating the data in application programs.

Because individual things in the real world are mapped to multiple entities in the E-R model or rows in multiple tables of an SQL DBMS, restoring a database representation of a single person including any employee or student information from a backup copy of a database is usually not possible. Restoration may be required due to an operator error that destroyed a particular data record. A restore operation would require an understanding of the relationships between the rows in the various tables representing a person to be able to restore the information for a single person. Restore operations typically do not have this capability. Restore operations typically reset the state of a whole table, not individual rows; but, since data in one table is dependent on data in other tables, restoring one table without the others will most often result in an database inconsistent with its design rules. Therefore SQL and object databases typically support only the backup and restore of a whole database, a time and resource consuming operation.

Another conventional implementation model limitation is the absence of any conceptual model for restrictions on values of attributes in the database. None of the models described above have any representation for the fact that an age should be between 0 and 120, or if an attribute "vehicle model" of a particular entity has value "Crown Victoria", then an attribute "vehicle manufacturer" of the same entity must be "Ford". Rather, in E-R, SQL and object models, the determination of permitted values is handled by the logic of a filtering program handing data before entry into the database or by an external data manipulation program which manipulates the data following retrieval and before presentation to the user. The legal conditions of the data are stored external to the database and therefore must be embodied in the external filtering or data manipulation program. This limitation leads to the prospect that two separate filtering or manipulation programs will operate inconsistently with respect to each other, and adds to the complexity of implementing and modifying such programs.

Another prior art limitation is the difficulty of modifying a data model in an operational database application. Many changes to the data model, such as adding or modifying attribute definitions or adding or modifying relationships between entities, require shutting down the operational database, unloading the affected data, re-engineering the data definitions, re-engineering and recompiling the application programs, and reloading the data into the redefined database. An example of a typical change that would require these steps is changing the data model from allowing one e-mail address per person to allowing multiple e-mail addresses per person. The main reason for this difficulty is that implementation of an attribute that may have multiple values requires additional table definitions in SQL and requires a different attribute definition in the object model.

Prior database schemas and management systems which are considered pertinent to the present invention include U.S. Pat. No. 4,479,196 to Ferrer et al, entitled: "Hyperedge Entity-Relationship Database Systems"; and, U.S. Pat. No. 5,713,014 to Durflinger et al., entitled: "Multi-Model Database Management System Engine for Database Having Complex Data Models".

SUMMARY OF INVENTION

One object of the present invention is to provide an attribute-refinement data definition model including three basic modeling constructs: an attribute description, a constraint, and an entity.

One other object of the present invention is to provide a database definition method which has a more descriptive set of modeling concepts and fewer constraints on their use in order to provide a better correspondence to real world data typically encountered in the database design process.

Another object of the present invention is a method for forming databases with entities having potentially unique combinations of attributes such that a particular entity need not have any similarity in attribute description to any other entity within the particular database.

A further object of the present invention is a database definition method which causes restrictions on attribute values to become an intrinsic part of the database so that the database itself may guarantee consistency irrespective of characteristics of any particular filter program used to add or modify data in the database.

One further object of the present invention is to provide a database definition method capable of enabling changes and additions in data definitions over time without requiring revision of any preexisting data definitions.

One more object of the present invention is to provide a database management system which enables data entities of a database to be replicated and/or restored independently of other entities.

Another object of the present invention is to provide an OTree clustering and storage method which guarantees the storage of an entity, its attribute values, relationships and indexing information on a contiguous logical block of a computer disk drive, a disk drive array, or other persistent storage system, if a sum of the number of bytes required by these various entity components is less than the number of bytes of a logical block. In addition, the OTree clustering and storage method results in a storage utilization of approximately 50 percent or better.

Another object of the present invention is to provide an application which provides a file system interface to entities stored in an attribute-refinement (A-R) data base management system (DBMS). The file system application stores files as A-R entities, and stores the data associated with a file as an attribute value of the A-R DBMS entity. The A-R DBMS file entities may posses other attribute values as well, and the file system application enables searches of the entities by these other attributes. A directory or folder in the file system application may correspond to the entities that satisfy a particular search criterion, and new files created in such directories and folders may automatically acquire attributes with values that satisfy the search criterion.

Another object of the present invention is a client/server embodiment of an A-R DBMS in which the OTree clustering and storage system resides on one computer system, and the application programmer interface, the entity manager, the constraint manager, the attribute description manager, the entity validator, and the search optimizer reside on a plurality of other computer systems connected to the OTree clustering and storage system via a computer network.

In accordance with principles of the present invention, a computerized attribute-refinement database method is provided for storing, retrieving and modifying data occupying data storage space comprising a database. The method comprises steps of locating available data storage space for storing new entities, reclaiming previously occupied data storage space upon deletion of an existing entity or deletion or reduction of an existing entity's attribute or attributes, and locating available data storage space when an entity acquires an additional attribute or when an entity's attribute is extended in length; locating available data storage space for storing multiple attribute descriptions, and reclaiming previously occupied data storage space after deletion or reduction of an attribute description; locating available data storage space for storing constraints where a constraint comprises a list of statements, reclaiming previously occupied data storage space upon deletion of a constraint, and locating available data storage space when an additional constraint is added; and, verifying consistency of entity attribute data upon input or modification with applicable constraints stored in the database.

In accordance with further aspects and principles of the present invention, an OTree clustering and storage schema provides general purpose data clustering and retrieval and is characterized by a property that all related components whose combined size is approximately less than a logical block size reside on the logical block containing the component packet and will therefore only require one storage array access for retrieval; a property that related components whose combined or individual size exceed a logical block require at most one additional storage array access, in short, the property that the number of storage accesses rises proportional to the size of the component; a minimum storage utilization of approximately 50%; and, a property that component data may itself be further partitioned into keyed data elements or keyed (nested) component packets, where the clustering of the keyed data elements or nested component packets obeys the properties described above, and that the access, insertion or deletion of any keyed data element or nested component packet will benefit from the efficiencies of keyed search structure algorithms, for example B+trees (Comer, 1979).

The foregoing objects and aspects of the present invention will be more fully understood and appreciated by those skilled in the art upon consideration of the following detailed description of preferred embodiments presented in conjunction with the accompanying drawings.

BRIEF DESCRIPTION OF DRAWINGS

FIG. 1A depicts an overview of the components of an A-R DBMS in accordance with principles of the present invention.

FIG. 1B depicts a legend for the shading of database components of the A-R DBMS shown in FIG. 1A.

FIG. 2A depicts an array comprising five attribute description records of an exemplary A-R DBMS in accordance with principles of the present invention.

FIG. 2B1 depicts an array comprising six exemplary data-type description records.

FIG. 2B2 depicts an array comprising enumerated subset descriptions associated with the data-type description records shown in FIG. 2B1.

FIG. 2B3 depicts an array comprising enumerated subset descriptions as in FIG. 2B2 augmented by optional symbolic names.

FIG. 2C1 depicts an array comprising three entity description records of the exemplary A-R DBMS in accordance with principles of the present invention.

FIG. 2C2 depicts an array of attribute value description records associated with the first entity description record of FIG. 2C1.

FIG. 2C3 depicts an array of attribute value description records associated with the second entity description record of FIG. 2C1.

FIG. 2C4 depicts an array of attribute value description records associated with the third entity description record of FIG. 2C1.

FIG. 3 depicts one example of a constraint description record of the exemplary A-R DBMS in accordance with principles of the present invention.

FIG. 4A depicts an attribute description record of the exemplary A-R DBMS augmented with a constraint index.

FIG. 4B depicts a constraint description record for the FIG. 4A record.

FIG. 8A1 illustrates a component packet for combining a plurality of independent, variably sized components.

FIG. 8A2 illustrates a component block packet for extending the component packet from FIG. 8A1 across multiple storage system units or logical blocks.

FIG. 8B1 illustrates a B+tree leaf containing two arbitrarily keyed component packets.

FIG. 8B2 illustrates a B+tree leaf containing one arbitrarily keyed component packet.

DETAILED DESCRIPTION

Figure 1:
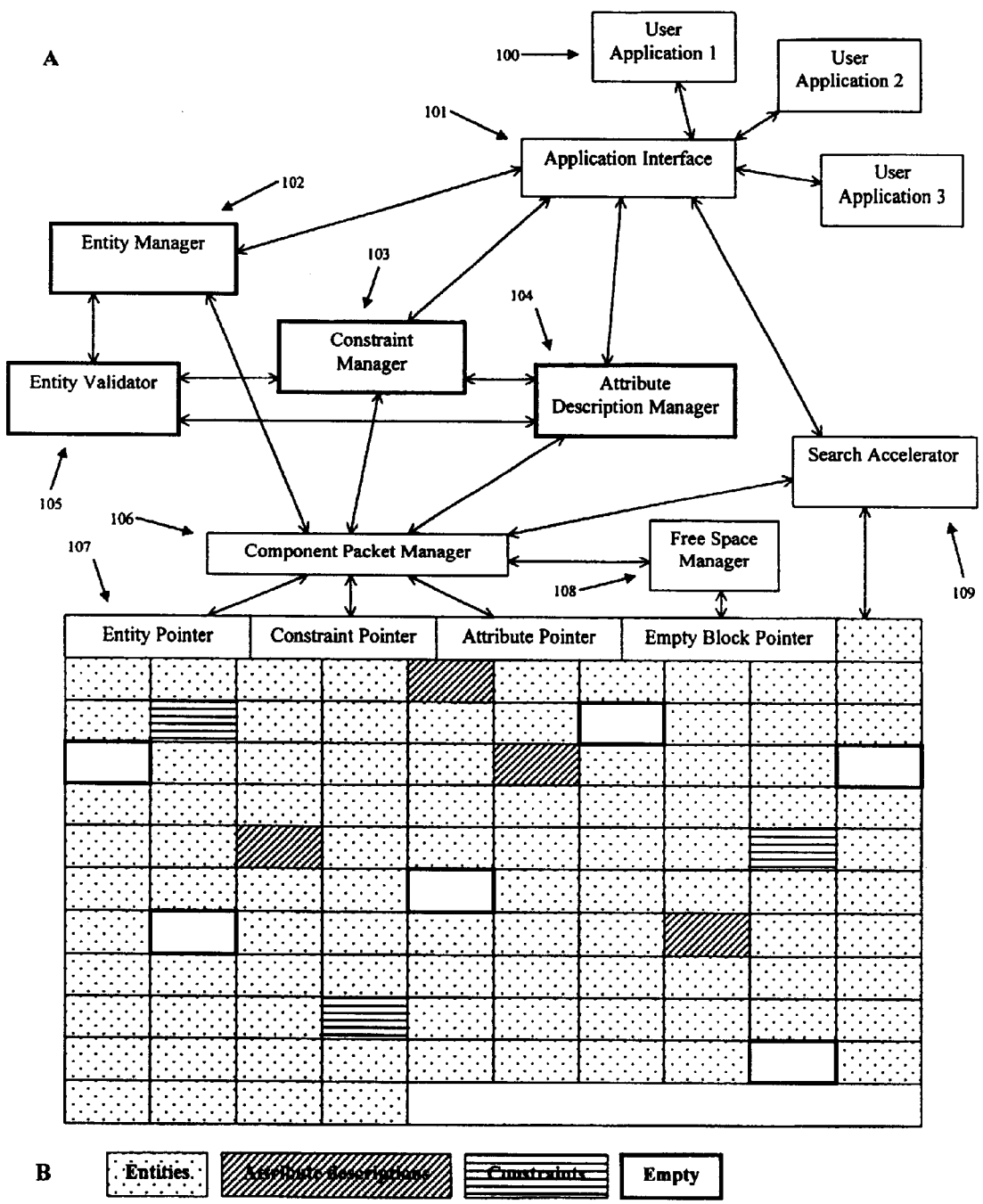

In accordance with principles of the present invention, the Attribute-Refinement data model (the A-R data model) provides a more descriptive and more flexible data model that includes and extends the conventional object, E-R and EE-R data models. The A-R model is more descriptive than the EE-R model, because while each EE-R modeling concept can be duplicated in the A-R model, the A-R model contains modeling concepts that cannot be duplicated by the EE-R model. The A-R model is more flexible than the EE-R model because the A-R model imposes fewer constraints on the use of its modeling concepts than the EE-R or object models. By the same reasoning, the A-R model also includes and extends the relational, network and hierarchical data modeling techniques of the prior art.

The A-R database management system (A-R DBMS) implements the A-R data model. The A-R model is therefore also an implementation model. A preferred embodiment of the A-R DBMS supports arbitrary changes to the database schema definition without requiring the unloading and reloading the entire database. Most A-R data model changes will typically not require any re-engineering of application programs. The A-R DBMS also supports replicated and restoring individual entities without resetting the state of the entire database. In addition, a single real-world thing or item, such as a person, for example, does not require the definition of multiple tables in the A-R DBMS, and therefore does not require multiple table accesses to retrieve the data corresponding to the thing or item in the database. The approach of the present invention thereby provides a performance improvement over existent implementation models.

The A-R data definition model comprises three basic modeling constructs: an attribute description, a constraint, and an entity. DBMS's in accordance with the A-R data definition model will have attribute descriptions, an optional set of constraints, and an optional set of entities. Attribute descriptions, constraints, and entities may be added and/or deleted over time in real time without having to reload the entire database. The attribute descriptions and the constraints can be thought of as the schema of the database, whereas the entities comprise the data of the database. The term refinement in the A-R model refers to the ability to provide additional descriptive information concerning the use of attributes, including combinations of attributes, by adding constraints.

An attribute description comprises a unique identifier and an associated data type. The unique identifier is provided to differentiate among all of the attribute descriptions. Examples of fundamental atomic data types include: integer, real number, Boolean, character string, or an enumeration (i.e., a finite subset of integers; for convenience, each value in an enumeration may be assigned a symbolic value; e.g., the enumeration {1, 2, 3} may be assigned {red, white, blue}).

An example of an attribute description is: "age" (i.e., the unique identifier) and integer (i.e., the data type). Another example of an attribute description is: "color", {1, 2, 3} (i.e., an enumeration) or equivalently: "color", {red, white, blue} (an equivalent enumeration using symbolic values rather than integers). Another example of an attribute description is: "car manufacturer", {Ford, Chrysler, General Motors} (symbolic values).

An attribute description may also specify whether the attribute is a joining attribute. A joining attribute corresponds to a mutual property, and a joining attribute's value contains an additional reference to an associated entity. For example, the attribute description for "salary" of data type integer may indicate a joining attribute, in which case an attribute value corresponding to this attribute description would contain both a value for the salary, for example 30,000, and a reference to another entity, for example the entity representing an employer.

An attribute description may specify whether the attribute is repeatable, meaning that an entity may have multiple values associated with this attribute. For example, an attribute description for an "email" attribute with a data type character string may indicate multiple or repeating values. A joining attribute may also be repeatable.

A constraint is an optional part of the A-R database schema. A constraint is a statement which evaluates to true or false when applied to an entity in the database. An example of a constraint is: if entity HAS attribute "age", then "age" is less than 120. Another example of a constraint is: if attribute "model" equals "Crown Victoria", then attribute "car manufacturer" equals "Ford". More specifically, a constraint may be a conditional statement of the following form: if A, then B; or, equivalently, A implies B, where A and B are compound logical statements of a particular form. In general, compound logical statements are similar in syntax and semantics to expressions controlling conditional statements in programming languages like Pascal or C (as described in The C Programming Language). The statement corresponding to A is called the antecedent and the statement corresponding to B is called the consequent.

The particular form of a compound logical constraint statement comprises one or more literals combined with a logical connective conjunction (logical AND), or combined with a logical connective disjunction (logical OR) as described in Logic For Mathematicians, pages 4 and 5. A literal may be an expression involving arithmetic operators, comparison operators, attribute description references, and attribute values. Examples of arithmetic operators include: multiplication, division, addition, subtraction, and exponentiation. Examples of comparison operators include less than, greater than, less than or equal to, greater than or equal to, equal to, and not equal to.

Literals may also utilize comparison operators specific to the A-R model, for example: HAS, HAS JOINING, and IN. The HAS operator is a unary operator whose operand is an attribute description reference. The operator yields the value TRUE if the entity under consideration has an attribute value for the referenced attribute. The HAS JOINING operator is described below. The IN operator is a binary operator whose semantics mirror those of the IN operator in the programming language Pascal. The IN operator takes an attribute description reference and a set of enumeration values as operands. The operator yields the value TRUE if the attribute value corresponding to the attribute description reference equals a value in the set of enumeration values.

An example of a literal is: attribute "weight" is less than 220 (where 220 represents a specific numerical value for pounds, grams, etc.). A literal may also be the negation of a simple statement. A literal may also be: entity HAS attribute "color", which is considered true if an entity has a value for the attribute "color". A literal may also be: "color" IN {red, white}.

An entity consists of a unique identifier and a list of pairs of attribute identifiers and associated values. An example of a single entity representing a person, Joe Smith, could be: entity ID 2, {("last name", Smith), ("first name", Joe), ("first name", Joseph), ("age", 38), ("weight", 220), ("hair color", brown), ("job", plumber), ("education", PhD. English Literature), ("email", joe@domain1.com), ("email", joe@domain2.com), ("email", joesmith@domain3.com)}. Another example of a single entity representing a particular automobile, for example, a 1992 Ford Crown Victoria, could be: entity ID 64, {("make", Ford), ("model", Crown Victoria), ("year", 1992), ("color", white), ("has police pack", TRUE), ("VIN Number", 1FX3XC4LMQ6)}.

If an attribute identifier corresponds to a joining attribute, an entity reference is also associated with the attribute identifier value pair. In the above example of entity 64 representing a particular automobile, if the attribute "make" is defined as a joining attribute, and then the attribute value in the entity would have a form: ("make", Ford, entity ID 17), where entity ID 17 represents another database entity representing the car manufacturer, Ford.

The HAS JOINING operator is defined as follows. HAS JOINING is a unary operator whose operand is an attribute description reference J. This operator yields the value TRUE if the entity under consideration has a value corresponding to the joining attribute J. The use of this operator implies the consequent applies to the joined or associated entity instead of the original entity under consideration. An example of such a constraint is: if entity HAS JOINING attribute "make", then entity has attribute "is car manufacturer" and "is car manufacture" is TRUE. This constraint is true if the entity under consideration has a value for the attribute "make", for example ("make", Ford, entity ID 17) above, and the joined entity (ID 17 in this case) has an attribute "is car manufacturer" and the attribute value is TRUE.

In accordance with principles of the present invention, an A-R database schema comprises a set of attribute descriptions and an optional set of constraints. A set of constraints is consistent if there is a set of entities for which all of the constraints are true. A consistent set of constraints could be, for example, if "model" equals Crown Victoria, then "make" equals Ford; and, if entity HAS attribute "make", then entity HAS attribute "model". The entity with ID 64 above satisfies both of these requirements. An example of an inconsistent set of constraints could be: if "age" is less than 38, then "weight" is less than 220; and, if "weight" is less than 220, then "age" is greater than 40. No single entity of a database could satisfy both of these requirements. An A-R database schema is consistent if the set of constraints is consistent.

A set of A-R entities is consistent with a set of A-R constraints if each constraint is true for each entity. For example, the set of all entities above (ID 2, ID 64, and ID 17) is consistent with the consistent set of constraints given above. An A-R database is consistent if its set of entities is consistent with the set of constraints of the schema.

An A-R database management system (A-R DMBS) comprises an application programming language interface, an entity manager, a constraint manager, an attribute description manager, an optional component packet manager, a optional search optimizer, and a storage array and free space manager which stores the attribute descriptions, constraints and entities. An A-R DBMS also consists of an entity validator, which verifies whether an entity is consistent with the set of constraints in the A-R schema. FIG. 1A depicts relationships between an entity manager 102, a constraint manager 103, an attribute description manager 104, and an entity validator 105, and traditional subsystems comprising a database management system. The entity manager 102, constraint manager 103, and attribute description manager 104 are manipulated by a user application 100 via an application interface 101. The application interface comprises a set of functions and data structures most preferably described by a known programming language like C, C++, Java, or Perl.

The entity validator 105 verifies the consistency of each entity's attribute values with the constraints managed by the constraint manager 103 and the attribute descriptions managed by attribute description manager 104. The attribute descriptions create implicit constraints on the attribute values; for example, whether an attribute is repeatable, whether the attribute is joining, and what the data type of the attribute is. The entity validator 105 checks each entity's attribute value list and verifies that each attribute value is consistent with the data type, that non-repeatable attributes are represented at most once in an entity's attribute value list, and that joining attributes have associated entity references. The entity validator 105 also verifies the explicit constraints managed by the constraint manager by evaluating each constraint using the values associated with a particular entity.

The entity manager 102, constraint manager 103, and attribute description manager 104 use a memory storage array 107 to store entity, constraint, and attribute description records comprising the A-R schema and database. The memory storage array 107 is defined as, and comprises, contiguous data storage space, and the array may be physically embodied within semi-conductor RAM of a single programmed digital computer, a single hard disk drive, an array of hard disk drives, other persistent storage devices and systems whether optical, magnetic, chemical, biological, or combinations thereof, or a memory array distributed across a number of storage appliances attached to a network or bus, for example. The storage array 107 may be continuous, or discontinuous, or more likely the array may be arranged or embodied as a series of fixed length logical storage blocks.

In the following descriptions, a storage array interface may allow an in-memory formatting of the data to be written to persistent memory. In other words, a storage array may function as an in-memory cache which is automatically written to persistence storage on an as-needed basis.

An optional component packet manager 106 may be employed to more efficiently utilize storage space and input/output bandwidth. A free space manager 108 keeps track of available space in the storage array 107. An optional search accelerator 109 applies standard indexing technologies (for examples as described in Elmasri, chapter 6) to the entities to enable faster location of entities whose values satisfy the search criterion.

FIG. 1B provides a legend for various shading styles used in the storage system 107 of FIG. 1A. Although the storage array 107 show each shaded element as having the same size, practical embodiments may utilize variously sized storage bins, as is common in the prior art relating to storage systems.

FIG. 2A is an array of attribute description records as stored in the storage array 107 of FIG. 1A. Each attribute description record 200 comprises a unique attribute identifier 201, an optional symbolic name 203, a data type identifier 204, a bit indicating whether the attribute may repeat 205, and a bit 206 indicating whether the attribute is a joining attribute. Each data type identifier 204 must occur in one of the A-R data type description records exemplified by FIG. 2B1. Each of the data type description records 210 of FIG. 2B1 contains the following information: a unique data type identifier 211; a description of the kind of data 212; and, for data type records with an enumerated kind of data, a reference to an enumeration subset list 213.

The kinds of data types allowed by the A-R schema comprise integer, real number, character string, Boolean value, and enumeration. A particular embodiment of an A-R DBMS could expand the set of data types allowed to include date, duration, monetary amount, for example. One particular additional data type is the 'file' data type. Attribute values records 240, shown in FIG. 2C2, whose corresponding attribute description record 200 refers to data type record 210 of kind 'file' could have arbitrarily large attribute values. 'File' type attribute values could be stored on a sequence of optionally indexed logical blocks. A 'file' type attribute belonging to an entity would enable entities of an A-R database to represent files in a file system. A user application 100 could provide a file system interface to other software applications. Via the file system application interface, entities in an A-R DBMS could appear as files to the end-users of the system in which the file system application is installed. In such an application an entity could have a list of attribute descriptions 200 that match each of the attributes supported by the given file system. Each of these attribute descriptions would have a data type ID 210 that matches the data type of the particular file system attribute being represented. The actual file data would be represented by an attribute description with a data type kind 212 of 'file'.

Figure 2:
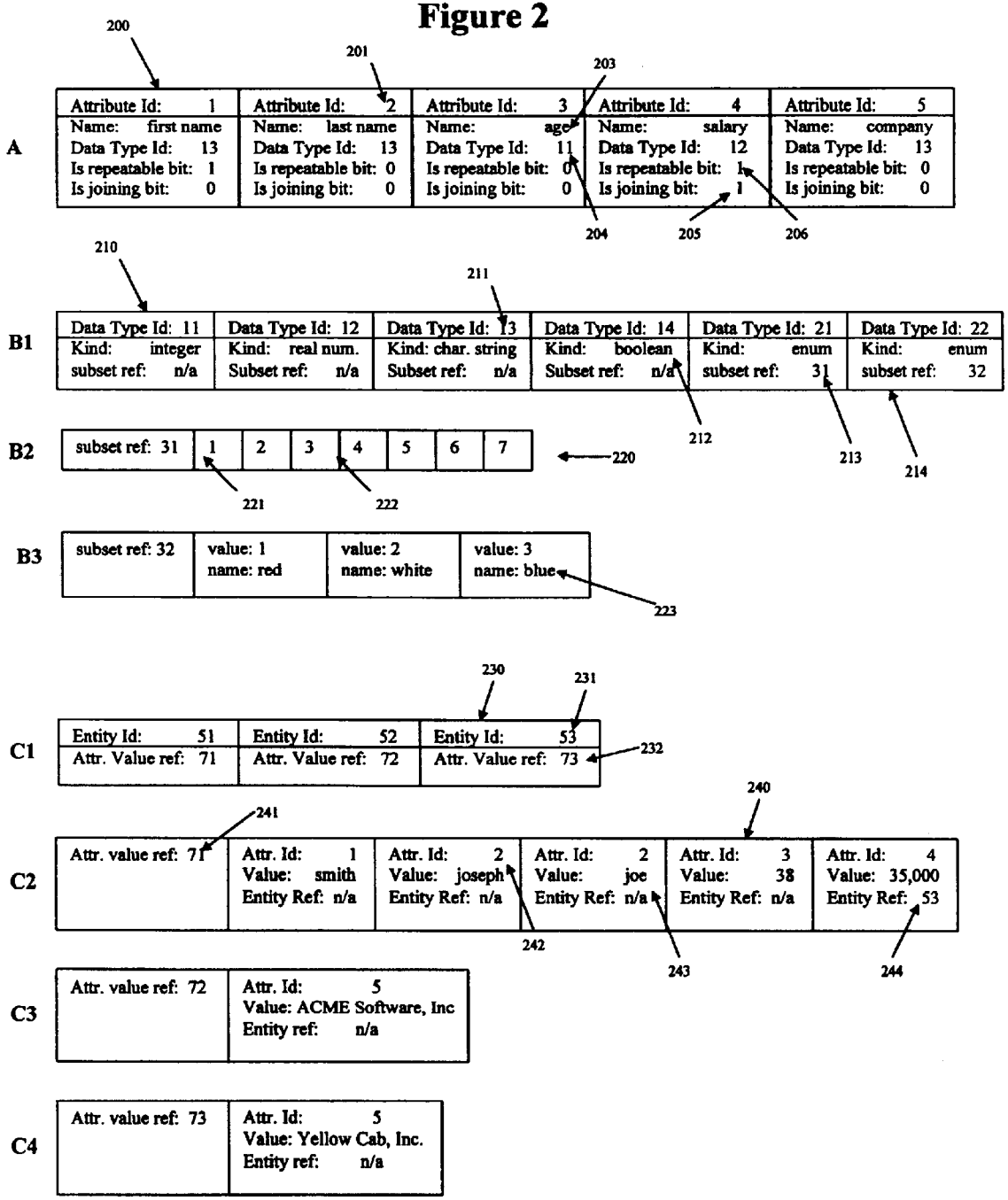
Figure 3:
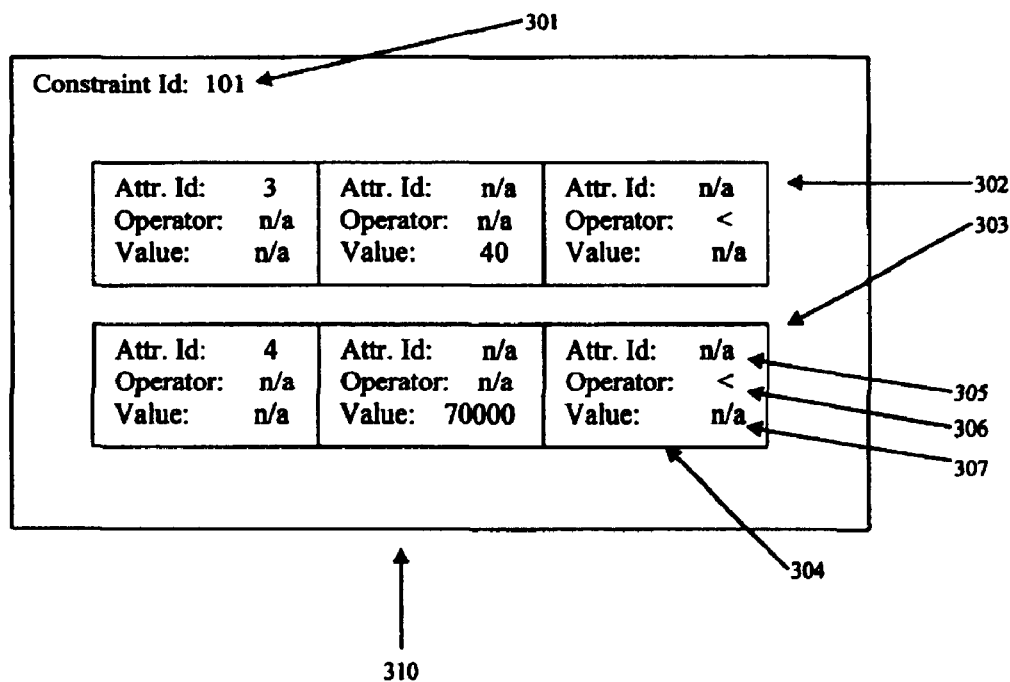

An embodiment of an A-R DBMS should be able to add additional enumerated data type records like record 214 in FIG. 2B1. Each enumerated data type record includes subset reference 213 that refers to a subset list record of a form illustrated in FIG. 2B2. An exemplary subset list 220 comprises a unique subset list identifier 221 and a list of integers 222 which comprise the valid enumerated values for the corresponding data type record. FIG. 2B3 illustrates a subset list as shown in FIG. 2B2 augmented by an optional symbolic name field 223.

FIG. 2C1 shows an entity record array, wherein each entity record 230 contains a unique entity identifier 231 and a reference to an attribute value array 232. FIG. 2C2 shows an attribute value array comprised of a unique attribute value array identifier 241 and an array of attribute value records. Each attribute value record 240 comprises an attribute description identifier 242, an attribute value 243, and an optional entity reference 244. The entity reference 244 is required for those attribute values having attribute description identifiers that refer to an attribute description which has a non-zero joining bit. The entity reference 244 must contain an identifier that corresponds to an entity identifier 231 of some entity record 230.

FIG. 3 shows a constraint record 310 comprising a unique constraint identifier 301 and two compound constraint statements 302 and 303. Each compound constraint statement comprises an array of postfix element records. The array of postfix element records represents an expression in reverse polish notation, also known as a postfix expression. Although FIG. 3 shows each array of postfix element records containing three records, in general the number of records is arbitrary. Each postfix element record 304 includes an attribute description identifier 305, and operator 306, and an attribute value 307. In any given postfix element record, only one of the three fields 305, 306, or 307 is active at a given moment. In the example shown in FIG. 3, in postfix element record 304, the operator 306 is active, i.e., "greater than", while the attribute description identifier 305 and the attribute value 307 are non-active (N/A). The array of postfix element records represents a compound statement as an expression involving arbitrary operators, values and attribute description references in standard postfix form. While the FIG. 3 example shows two compound statements 302 and 303 and six postfix element records 304, a unique constraint identifier 301 could comprise greater or fewer than two compound statements 302 and 303, and greater or fewer than six postfix element records 304.

The entity manager 102 may present the entity validator 105 with each new and modified entity to check for consistency with the constraints before storing the new or changed entity in the storage array 107. The entity manager 102 would provide both the entity record 230 and the associated attribute value array shown in FIG. 2C1 to the entity validator 105. For each attribute value record 240, the entity validator 105 retrieves from the attribute description manager 104 the attribute description record 200 whose attribute identifier 201 matches the attribute value record's attribute identifier 242.

The entity validator 105 also retrieves the data type record 210 whose data type identifier 211 matches the attribute description record's data type identifier 204. If the data type record 210 has "kind" field (212) "enum", then the entry validator 105 also retrieves the subset list 220 with subset reference 221 matching the data type record's subset reference 213 from the attribute description manager 104.

The entity validator 105 then verifies that the attribute value 243 is consistent with the kind of data indicated by the data type record 212; and, in the case of an enumerated data type, verifies that the attribute value is one of the values in the subset list. If the attribute description's repeatable bit field 206 is 0, the entity validator 105 verifies that only one instance of the value occurs in the attribute value array. If the attribute description's joining bit field 205 is 1, the entity validator 105 verifies that the attribute value's entity reference field 244 contains a value matching the entity identifier value 231 of some entity record in the storage array 107. This verification may be accomplished by querying the entity manager 102.

For each constraint managed by the constraint manager 103, the entity validator 105 evaluates the antecedent statement 302 with respect to the attribute values in the attribute value array under consideration. Each compound constraint statement is evaluated by applying a stack-based postfix expression interpreter to the postfix expression 302, as described in Aho, pages 62–69. If a postfix element record has a value associated with the attribute description identifier field 305, then the value associated with the attribute value record with a matching attribute identifier 242 is pushed onto an expression stack. In effect, each postfix element record with an attribute identifier is treated as a variable reference in a programming language like Pascal or C.

If the antecedent statement evaluates to TRUE, then the consequent statement 303 is similarly evaluated. If the consequent evaluates to FALSE, then the entity under consideration is considered invalid. The result is returned to the entity manager 102 by the entity validator 105. If an entity has repeating values for a particular attribute, each constraint statement is evaluated for each combination of repeating values.

Figure 4:
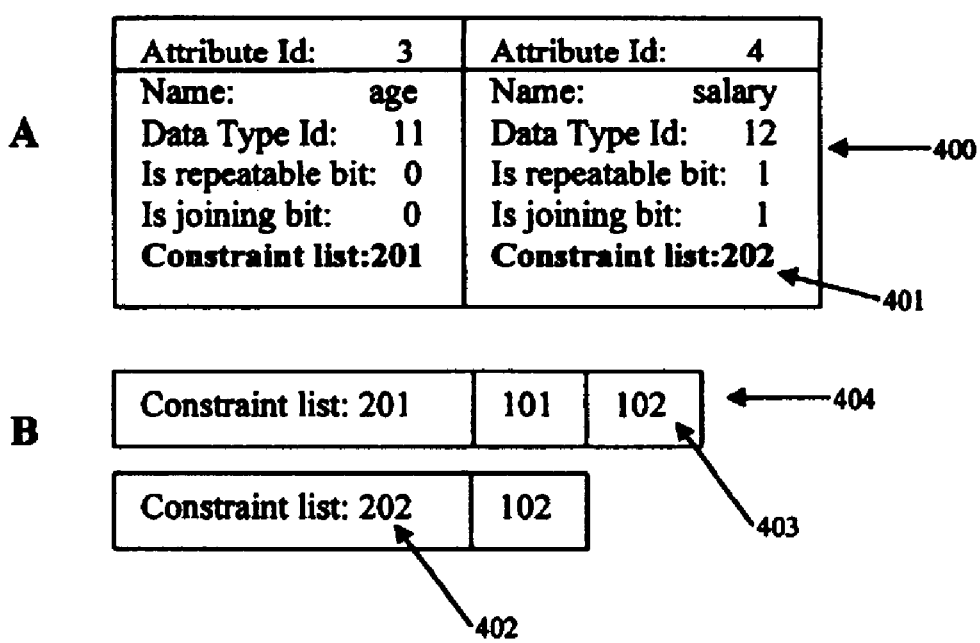

FIG. 4A illustrates an alternate embodiment of an attribute description record 400 whose advantage lies in reducing the number of constraint statements that the entity validator 105 must evaluate. The attribute description record 400 is augmented by a constraint list reference field 401. This field 401 contains a constraint list identifier which may by used to retrieve a constraint list from the attribute description manager 104. As illustrated by FIG. 4B, a constraint list 404 comprises a unique constraint list identifier 402 and a list of constraint identifiers 403.

The constraint lists are modified by the constraint manager 103 when a new constraint statement is added to the database schema, or when an existing constraint statement is modified. Returning to FIG. 3, for each postfix element record 304 of the antecedent statement 302 with a value for the attribute description identifier field 305, the constraint manager 103 adds the constraint id to the constraint list associated with the attribute description record whose attribute description identifier field 201 matches the postfix element record attribute description identifier 305.

The entity validator 105 uses the augmented attribute description record by retrieving the constraint list for each attribute description record used in the validation process. For each attribute value record 240 in the attribute value array of FIG. 2C2 associated with the entity under consideration the entity validator 105 adds the list of constraint identifiers to a temporary, in-memory, constraint identifier list maintained within the entry validator 105.

The entity validator 105 then only evaluates the constraints whose constraint identifiers 301 match the constraint identifiers in the temporary constraint identifier list. This reduces the number of constraints evaluated by the entity validator 105, but still assures that the entities are consistent with all the constraints in the A-R schema, since only those constraints that did not involve the attributes values associated with the entity under consideration were skipped.

Figure 5:
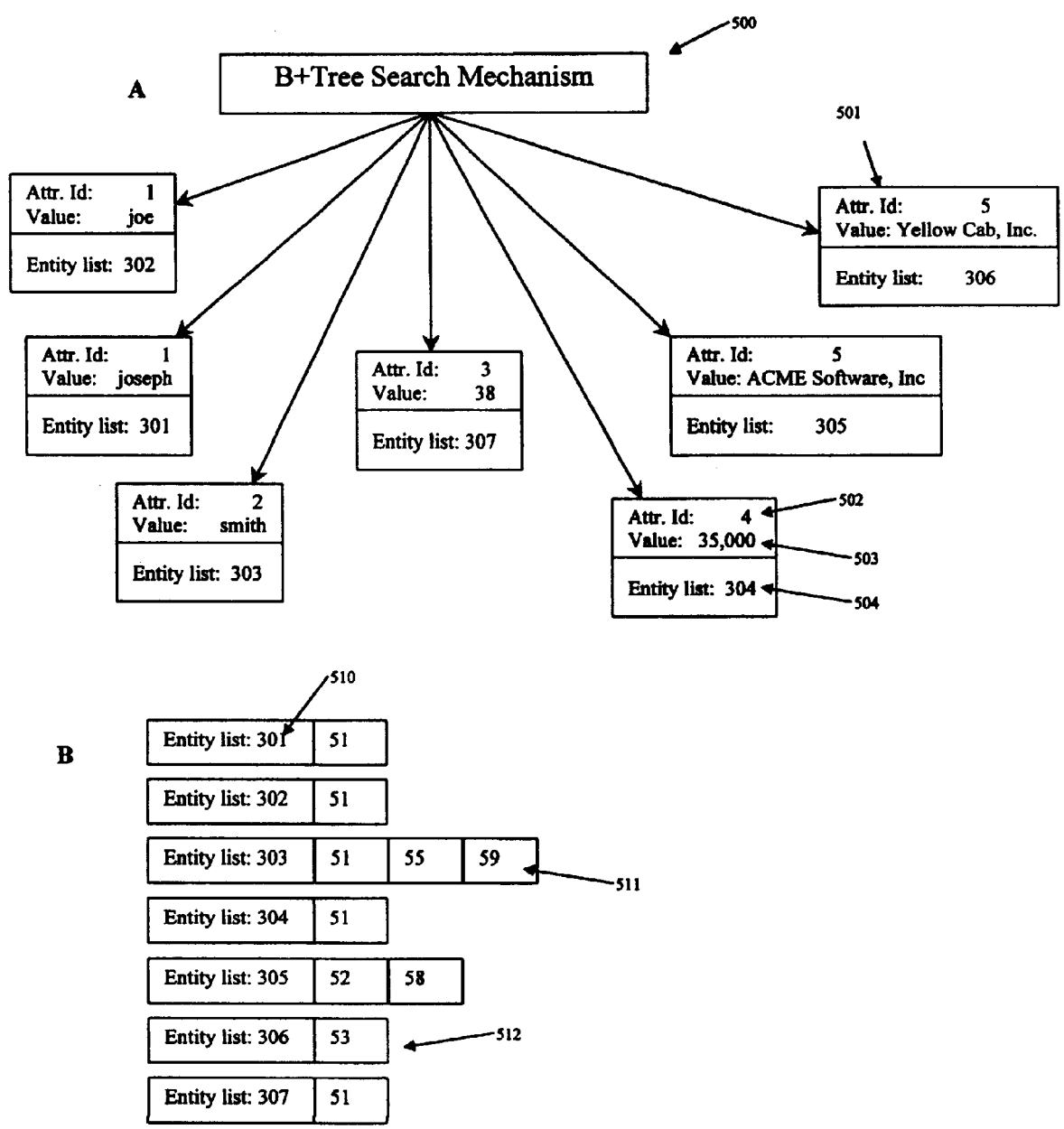
FIG. 5A depicts an attribute value index search tree for locating entity description records within the A-R DBMS.
FIG. 5B depicts a collection of entity lists, each of which is associated with a search tree entry of the FIG. 5A search tree.

FIG. 5A illustrates an attribute value search index method 500 which utilizes a standard B+tree (Comer, 1979) for indexing entities based on attribute values. Each B+tree entry 501 is keyed by the values of two fields: attribute description identifier 502 and attribute value field 503. The data associated with each B+tree entry 501 is an entity list identifier 504. FIG. 5B illustrates the structure of several entity lists, each comprising a unique entity list identifier 510 and an unlimited number of entity identifiers 511.

The attribute value search index of FIG. 5A and the associated entity lists of FIG. 5B are used by the search accelerator 109 to locate entities in the storage array 107 given desired attribute values or ranges of attribute values. The attribute value search index is updated by the entity manager 102 whenever an entity is added or its attribute values are modified. Each attribute value of the entity's associated attribute value array (as illustrated in FIG. 2C2) is used to create a new B+tree entry 501 by copying the attribute description id 242 and the attribute value 243 into the attribute description identifier field 502 and the attribute value field 503 of the B+tree entry.

If a matching entry does not already exist in the B+tree, the entry is added to the search tree. A new entity list is created and assigned a unique entity list identifier, whose value is stored in the entity list identifier field 504 of the newly added search tree entry. The current entity identifier is added to the new entity list. If a matching entry is found in the B+tree, the current entity identifier is added to the entity list whose entity list identifier 510 matches the entity list identifier field 504 of the matching search tree entry. The retrieval of entities with particular attribute values follows standard indexed searches described by the prior art, as in Elmasri, chapter 6.

Figure 6:
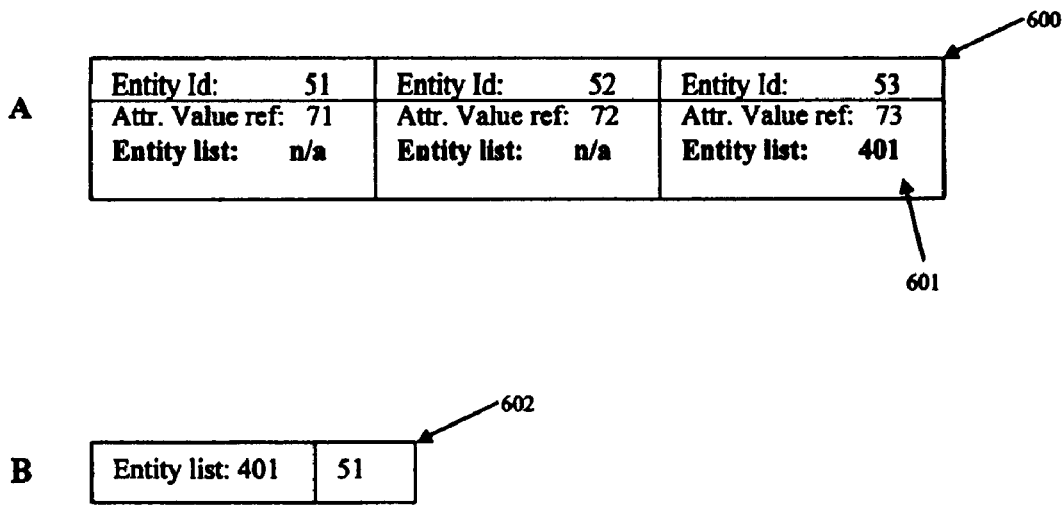
FIG. 6A depicts an array of three entity description records augmented by back references for enabling more efficient updates of the attribute value index shown in FIG. 5A.
FIG. 6B depicts a collection of index back reference lists, each list being associated with an entity description record in FIG. 6A.

FIG. 6A illustrates an entity record 600 (similar to entity record 230) augmented by an entity list identifier 601. FIG. 6B illustrates entity list 602 which is identical in form to entity list 512 of FIG. 5B. Entity lists are created and/or added to whenever an entity is referred to by a joining attribute. FIG. 2C2 illustrates an attribute value array containing a joining attribute which refers to the entity with identifier 53 (reference numeral 244). When this joining attribute value and entity reference is added, the entity manager 102 adds the entity identifier of the entity associated with the joining attribute, in this case 51, to the entity list associated with the referenced entity, in this case 53. If no entity list is associated with the referenced entity, a new list is created and assigned a unique identifier. The new unique list identifier is recorded in the entity list field 601 of the entity record associated with the referenced entity, in this case the entity record with entity identifier 53.

The function of the entity list illustrated by reference numeral 602 is to enable the entity manager 102 to maintain referential integrity with respect to the joining attributes. Referential integrity implies that each joining attribute value refers to an existing entity record. This property may wind up violated if the referred-to entity is deleted, for example, deleting the entity with identifier 53. The entity list 602 is used by the entity manager 102 to retrieve the entity records which have associated joining attribute values that refer to the deleted entity (identifier 53). These joining attribute values are then deleted, thereby ensuring referential integrity.

Figure 7:
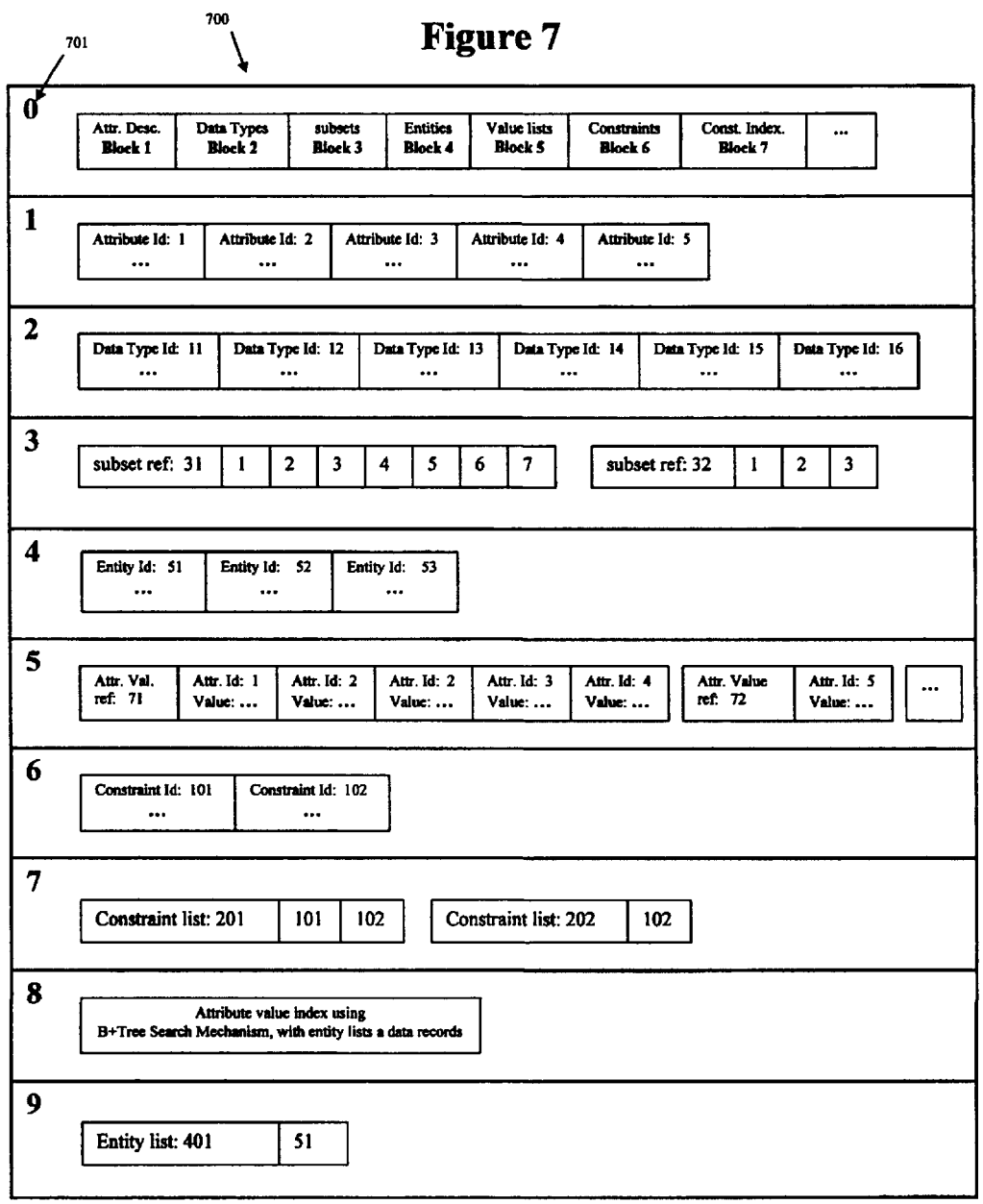
FIG. 7 illustrates an embodiment of the storage system 107 using a set of fixed sized logical storage blocks.

FIG. 7 illustrates an embodiment of the storage array 107, which comprises a set of logical blocks of a fixed size. Each logical block 700 resides at a particular location, also termed an offset, in a storage system, such as a disk drive for example. The logical block's offset divided by the logical block size yields the (bold face) logical block number 701 indicated at the left of each row in FIG. 7. Multiple logical blocks may be combined to store items larger than the logical block size.

Each logical block may contain an array of records of a particular type. Logical block 1 contains an array of five attribute description records 200. In the FIG. 7 illustration, logical block 2 contains six data type records 210. Logical block 3 contains two subset lists 220. Logical block 4 contains three entity records 230. Logical block 5 contains three attribute value arrays each comprising attribute value records 240. Logical block 6 contains two constraint records 310. Logical block 7 contains two constraint lists 404. Logical block 8 contains the root of the attribute value index B+tree 500. Logical block 9 contains one entity list 602.

Logical block 0 contains a directory of logical block numbers for each record type. Given a request for a particular type of record with a particular identifier, for example an entity record with identifier 51, the appropriate manager (i.e., the entity manager 102 in this example) uses this directory to locate the logical block containing the entity records, in this example logical block 4, and then searches the record array for the matching record. In the case where a record array size exceeds the logical block size, the record array could be broken into multiple logical block-sized sub-arrays. The logical block 0 directory entry could then contain a list of logical block numbers, one for each logical block containing a corresponding sub-array. If the number of logical blocks causes the directory itself to exceed the logical block size, then the last logical block number in the list will refer to a logical block containing a continuation of the list of logical block numbers. This continuation block is often called an indirect block, and this approach is known in the prior art, for example in reference to the UNIX file system and its i-node structure.

One of the drawbacks of the indirect block continuation approach is that a linear search is required of the indirect blocks to find a record with a particular identifier, in the case when a record array exceeds a logical block size. However, since each of the record types and record arrays described above contains a unique identifier field, an index based on this record identifier could be created for each of the record types. For example, an index for attribute description records 200 would be keyed on attribute description identifiers 201.

Each index could comprise a keyed search structure, for example, a B+tree, keyed on the unique identifier of the corresponding record type, and the data associated with each key preferably comprises the record data. In this alternate embodiment of the storage array 107, logical block 0 would contain the logical block offsets of the root nodes of each of these B+tree indices. Each record search, addition, deletion, or modification preferably corresponds to a B+tree search, addition, deletion or modification, based on the record's unique identifier.

If the size of the records of a particular type, for example, attribute description records 200, is less than the logical block size, the B+tree consists of a single leaf (as described in Comer, 1979), in which case the logical block 0 directory entry will contain the logical block offset of the record array. If the records do not fit within one logical block, the B+tree will contain at least two levels, and the logical block 0 directory entry will contain the logical block offset of the root node. Each non-leaf B+tree node contains key and logical block offset pairs which either refer to other non-leaf nodes or refer to leaf nodes.

One of the drawbacks of using separate keyed search indices to locate information embodying the various record types of the A-R database system is that multiple index lookups/modifications must be performed in order to access the information needed to perform entity access and verification. For example, each entity access requires three B+tree index lookups: one to access the entity record 230, one to access the attribute value array described on FIG. 2C2, and one to access the entity list 602. Similarly, an attribute description access requires two index lookups: one to access the attribute description record 200, and one to access the constraint identifier list 404.

Each attribute value array and entity list is associated with exactly one entity record, and similarly each constraint identifier list is associated with exactly one attribute description record. Therefore all but one of the lookups can be eliminated if the attribute value array and the entity list are stored in the same entry that also contains the entity record, and if the constraint identifier list is stored in the entry that holds the attribute description record.

Figure 8:
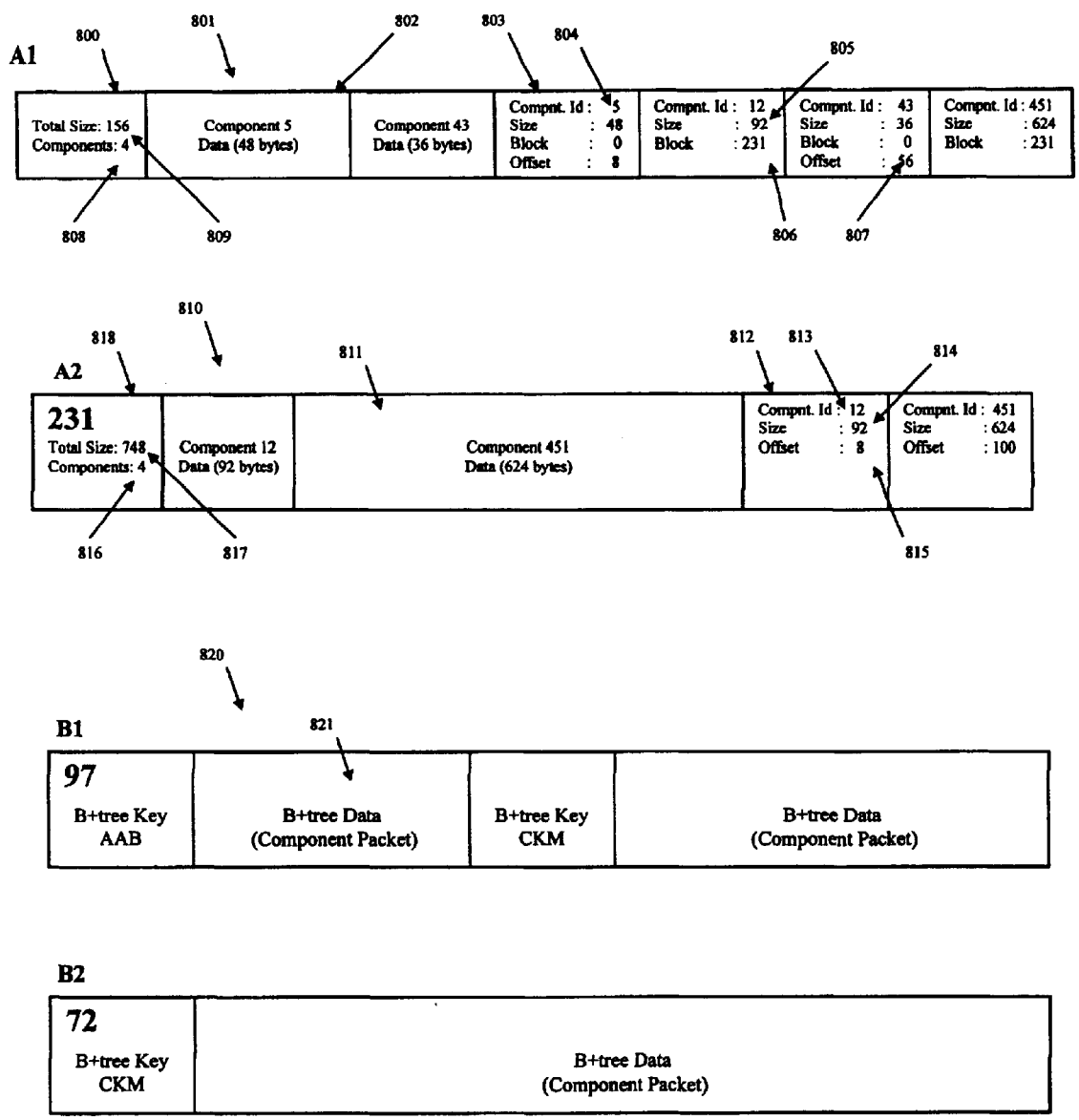

FIG. 8A1 illustrates a component packet 801, created by an alternative embodiment of the Component Packet Manager 106, whose function is to combine a plurality of independent, variably sized components. A component packet 801 could be used to combine the entity record 230, the attribute value array of FIG. 2C2, and the entity list 602 of FIG. 6B into one contiguous sequence of bytes.

In accordance with principles of the present invention and as illustrated in FIG. 8A1, a component packet 801 comprises a plurality of component data records 802, a plurality of component description records 803 arranged in an array, and a header record 800 comprising two fields: a total size field 809 and a number of components field 808. Each component data record may consist of arbitrary data, for example the entity list 602. Each component description record 803 comprises a component identifier 804 which is unique within the component packet's component description records. Two different component packets may have component description records with the same component identifier 804. A component description record 803 also comprises a size field 805, a logical block number field 806, and a component packet offset 807. Size field 805 specifies the number of bytes the component occupies. The block number field 806 specifies the logical block number where the component resides. If the logical block number is 0, the component resides in the component packet itself, and the offset field 807 indicates the byte offset from the beginning of the component packet where the component data is to be found.

Component packets are created and modified by the component packet manager 106 at the occurrence of writing to the memory array 107. Changes to a component packet include adding a new component, i.e. a component whose identifier does not already occur in one of the component description records, modifying an existing component by changing the component data without changing its size, modifying an existing component by increasing or decreasing its size, or deleting an existing component packet.

Adding a New Component

When a new component (i.e. a component whose identifier does not occur in any component directory record) is added to a component packet, the component packet manager 106 calculates whether the expected size of the component packet including the new component exceeds a fixed upper limit. The upper limit is typically a nominal fixed logical block size of the storage array 107 minus some overhead, for example the overhead associated with a B+tree leaf. The expected component packet size is calculated by adding the size of the component data plus the size of a new component description record 803. The B+tree overhead is typically the minimum number of bytes required by a B+tree leaf with one entry, including those bytes required by the key for that entry. If the expected component packet size does not exceed the predetermined upper limit, a new component description record is added to the component packet. The identifier field 804 of the new component description record is set to the identifier of the new component, the size field 805 is set to the size of the new component, and the logical block number field 806 is set to zero. The component description records may be sorted by the identifier field to enable the use of a binary search algorithm for more quickly locating a component description record. The entire array of component description records is shifted right by the size of the new component and the new component data is copied into the opened space. The offset of the beginning of the opened space is recorded in the offset field 807. The number of component description records 808 is incremented by one; and, the total size field 809 is incremented to add the size of the new component plus the (fixed) size of a component description record.

If the process of adding a new component to a component packet results in a component packet size exceeding the nominal upper limit, three cases could arise. In the first case, the new component's size could equal or exceed one half the logical block size of the storage array 107. In the second case, the new component's size is less than one half the logical block size of the storage array, and the component packet has no component directory entry 803 that simultaneously has a size field 805 that is less than one half the logical block size of the storage array and whose block number field 806 is non-zero. In the third case, the new component's size is less than one half the logical block size of the storage array and the component packet already has at least one component directory entry 803 that simultaneously has a size field 805 that is less than one half the logical block size of the storage array and whose block number field 806 is non-zero. This third case implies additional logical blocks of the storage array 107 are occupied by component data associated with this component packet, where the sizes of the components in the additional logical blocks are less than half the logical block size of the storage array.

In the first case above, the component packet manager 106 requests as many empty logical blocks from the free space manager 108 as are required by the new component. The component packet manager 106 initializes this new space as a component block packet 810 as illustrated on FIG. 8A2. The structure of a component block packet 810 is very similar to the component packet 801 shown in FIG. 8A1. A component block packet 810 comprises a plurality of component data records 811 arranged in an array, a plurality of component block directory records 812 arranged in an array, and a storage block header 818 comprising: a total size field 817 and a number of components field 816 representing the number of component block directory entries. Each component block directory record 812 comprises three fields: a component identifier field 813, a size field 814, and an offset field 815.

A component block packet need not occupy all space available on a logical block of the storage array. FIG. 8A2 illustrates a component block packet residing on logical block 231. FIG. 8A2 does not show the unused space that could follow the component block packet on logical block 231.

An empty component block packet comprises only the component packet header 818 whose total size field 817 is initialized to the size of the component packet header (typically 8 bytes) and whose number of components field 816 is set to zero. When adding a new component to a component block packet 810, the component packet manager 106 adds a new component block directory record 812 to the array of component block directory records and sets the component identifier field 813 to the component identifier of the new component, and sets the size field 814 to the number of bytes required by the new component. The component packet manager 106 then shifts the entire storage component directory array to the right by the size of the new component. This right-shift opens an empty area within the storage block for the new component's data. The component packet manager 106 sets the offset field 815 to the byte offset of the new component relative to the beginning of the storage block and increments the total size field 817 by adding the new component's size and increments the number of components field 816 by one.

In the second case above, the new component's size is less than half the logical block size of the storage array 107, and the component directory record array contains no entry whose size field 805 is less than half the logical block size of the storage array and whose block number field 806 is non-zero. In this case, the component packet manager 106 requests an unused logical block from the free space manager 108, and initializes this new logical block as an empty component block packet.

The component packet manager 106 then initializes an empty, temporary component packet in memory space, and copies into this temporary component packet all the component directory entries of the existing component packet whose size equals or exceeds half the logical block size of the storage array. The component packet manager 106 then creates a temporary in-memory component directory record array comprising only those component directory records whose size field 805 is less than half the logical block size of the storage array and whose block number field 806 is non-zero. The component packet manager 106 then adds to the temporary component directory array a component directory record 803 representing the new component. This component directory record 803 includes the new component identifier and size. The logical block number and offset of this record is set to zero. The component packet manager 106 then sorts this temporary component directory record array by size, and the resulting component directory array is then used to guide insertion of components into the temporary in-memory component packet. Components are copied from the existing component packet into the in-memory component packet until the addition of a next component from the in-memory component directory array would cause the in-memory component packet to exceed the logical block size of the storage array minus the total size of the remaining component directory records, i.e. the records of the components not yet added to the in-memory component packet. These remaining components are added to the newly initialized component block packet. Component directory records 803 for those components packed onto the component block packet are also added to the in-memory component packet. These component directory records are initialized as described above except the logical block number 806 is set equal to the logical block number of the component block packet and the offset is set to zero.

The size of the component block packet is less than the logical block size of the storage array because at most two components could not fit in the in-memory component packet, and each of those components are less than half the logical block size of the storage array.

The in-memory component packet is copied out to the storage array, overwriting the existing component packet. Both the in-memory component packet and in-memory component directory array are now superfluous and may be discarded.

The packing method described above involving the in-memory component packet and in-memory component directory array maximizes the number of components residing in the component packet by virtue of the sorting by size of the temporary in-memory component directory. Other packing criteria could be applied at this step, for example each component could be alternately added to the temporary in-memory component packet and the component block packet, thereby distributing the components more or less evenly between the two. This alternative method would maximize the amount of available space on both the component packet and component block packet.

Regardless of the packing criteria, the sum of the component sizes exceeds the size of one logical block of the storage array 107, and the storage space consumed by the component packet and the component block packet is no more than two logical blocks of the storage array, thereby achieving an approximate utilization of at least 50% of the storage array 107.

In the third case above, the new component's size is less than half the logical block size of the storage array and at least one component directory record has a size less than half the logical block size of the storage array and has a non-zero logical block number. The component packet manager 106 sums the sizes of each component residing on each of these distinct component block packets, and determines if any of these component block packets could accommodate the new component without exceeding the logical block size of the storage array 107. If so, the component packet manager 106 selects the component block packet with the most available space satisfying this criterion. The component packet manager 106 then creates a temporary in-memory component packet and a temporary in-memory component directory record array as above, and adds to the in-memory component directory array those component directory records corresponding to the components stored on the chosen component block packet and those component directory records corresponding to the components whose size 805 is less than half the logical block size of the storage array and whose logical block number 806 is zero. The component packet manager 106 also creates an empty, temporary, in-memory component block packet.

The component packet manager 106 then sorts the in-memory component directory record array, and packs both the in-memory component packet and the in-memory component block packet as described above. Both the in-memory component packet and the in-memory component block packet are copied to the storage array 107, overwriting the existing component packet and component block packet.

In the third case, it may occur that no component block packet has room for the new component. If this situation occurs, the component packet manager 106 follows the method outlined in the second case and adds a new component block packet. The packing of components resulting from the third case also achieves an approximate storage utilization of at least 50%.

Deleting an Existing Component

There are also three cases to consider when deleting components from a component packet, and the description of each case is the same as each case described above. In the first case, the component packet manager 106 returns the total number of logical blocks occupied by the component block packet to the free space manager 108 and deletes the corresponding component directory record from the component packet. In the first case, the component packet decreases in size by the size of a component directory record, and the component packet manager 106 subtracts this size from the total size field 809 and decrements the number of components field 808 by one. Thereafter, the logical blocks occupied by the deleted component block packet are available for reuse.

In the second case, the component packet manager 106 deletes the component directory record and shifts the component packet bytes from the deleted component's offset plus the deleted component's size left by the number of bytes occupied by the component's data (i.e. its size 805). In the second case, the total size field 809 of the component packet decreases in value by the size of the deleted component plus the size of a component directory record.

In the third case, either the deleted component resides in the component packet or in a component block packet. If the deleted component resides in the component packet, the component packet manager 106 follows the steps outlined for the second deletion case. If the deletion of the component causes the component packet size to fall below one half the logical block size of the storage system, then the component packet manager 106 calculates the sum of the component data sizes for each of the component block packets and if the total size of the one of the component block packets when added to the current component packet size is less than the logical block size of the storage array 107, the component packet manager 106 transfers the component data from the smallest component block packet satisfying this constraint to the component packet and returns the logical block occupied by the component block packet to the free space manager 108 for reuse. If no such component block packet exists, this condition implies that each of the component block packets is greater than one half full, and that the sum of the size of each of the component block packets and the component packet is greater than the logical block size of the storage array. This condition implies that the sum of the size of any one-component block packet and the component packet is greater than the logical block size of the storage array. Therefore, given N component block packets, the total number of logical blocks occupied by the component packet and the component block packets is N+1. N 1 component block packets utilize greater than (N 1) B/2 bytes, where B is the logical block size of the storage array, and the remaining component block packet plus the component packet require greater than B bytes, so the minimum number of bytes required by all the component block packets and the component packet is (N 1)B/2+B, which equals B(N+1)/2. So in the third case, if the deleted component resides in the component packet and the deletion of that component causes the size of the component packet to fall to less than half the logical block size of the storage array, and no component block packet can be combined with the component packet without increasing the size of the component packet to greater than the logical block size of the storage array, then logical block utilization will still be roughly greater than 50%, so the component packet manager 106 does not have to alter the packing of the components any further.

In the third case, if the deleted component resides on a component block packet, then the component packet manager 106 deletes the component directory record from the component packet and deletes the component data 811 and storage component directory record 812 from the component block packet. If the total size of the components remaining in the component block packet falls below one half the logical block size of the storage array, the component packet manager 106 adds the total size of the remaining components in the component block packet to the current size of the component packet and if this sum is less than the logical block size, the component packet manager transfers the components from the deleted component block packet to the component packet, and returns the logical block numbers occupied by the deleted component block packet to the free space manager 108 for reuse. Otherwise, the component packet manager 106 calculates the sum of the component data sizes for each of the other component block packets. If the total size of one of the component block packets plus the total size of the remaining components of the deleted component's storage block is less than the logical block size, then the component packet manager 106 combines the components from the two component block packets onto one of the component block packets and returns the other component block packet number to the free space manager 108 for reuse.

Modifying an Existing Component

A modification of an existing component may be treated as a deletion followed by the addition of a new component. The component packet manager 106 takes this approach if either the old component size is equal or greater than one half the logical block size of the storage array and the new size is less than one half the logical block size, or vice versa. If the old and new component sizes are both less than half the logical block size of the storage array, then two cases must be considered. In the first case, the modified component resides in the component packet. In this case, the component packet manager 106 deletes the component data 802 from the component packet, and then adds the changed component data as if it were a new component.

In the second case the modified component resides in a component block packet. If the new component data is smaller than the existing component data, the component packet manager 106 replaces the old component data with the new data. Then, the components stored to the right of the modified component and the component block directory records are shifted to the left by a number of bytes equal to the difference between the old component size and the new component size. The component packet manager 106 also updates the size field 814 of the component block directory record 812 to reflect the modified component, and also decreases the total size field 817 by the size difference. The component packet manager 106 also updates the size field 805 of the component directory record 803 to reflect the new component size. If the size of the resulting component block packet falls below one half the logical block size, the component packet manager 106 invokes the packing technique described in the deletion of existing components discussion, above.

If the new component data is larger than the existing component data, the component packet manager 106 uses the technique for adding a new component described above to determine whether the component block packet with the modified component data and the component packet can be repacked without violating the size constraint that neither packet exceeds the logical block size of the storage array 107. If repacking would violate the size constraint, the component packet manager 106 uses the technique described above under the deletion of existing components heading in order to locate another component block packet that can be combined with the modified component block packet without violating the logical block size constraint. If repacking still violates the logical block size constraint, the component packet manager 106 follows the technique described under the heading "Adding a New Component" above, where the component packet already has components residing in component block packets. The technique described above is modified by the use of an additional empty, temporary, in-memory component block packet. The packing technique adds as many components to the component packet as the logical block size constraint will allow, then the remaining components are split equally between the two temporary, in-memory component block packets. The component packet manager 106 then requests an additional logical block from the free space manager 108, updates the logical block number field 806 of the repacked components, and then copies the in-memory component packet and component block packets to the storage array.

Using the packing techniques described above, the component packet manager 106 is able to maintain an approximate logical block utilization of at least 50% and is able to accomplish most additions and changes to the components by accessing at most two storage array logical blocks. In addition, the component packet manager 106 is able to retrieve any component's data with at most one additional storage array access once the component packet has been retrieved.

In order to retrieve a component the component packet manager 106 searches the component directory record array for a record whose component identifier field 804 matches the identifier of the desired component. The component directory is located by using the total size field 809 to locate the end of the component packet, and by moving to the left the number of component directory records indicated by the number in the components fields 808. If the component directory record array is sorted by component identifier, a binary search may be used to locate the desired component directory record, otherwise a linear search will locate the record. If the logical block number field is zero, then the offset field 807 indicates the byte offset of the beginning of the component data, counting from the beginning of the component packet. If the logical block number field is non-zero, then the component packet manager 106 requests the logical block residing at the given logical block number, and searches the component block directory record array for the matching component identifier. The offset field 815 indicates the byte offset of the beginning of the component data, counting from the beginning of the component block packet.

Combining Component Packets and Keyed Search Structures

A given database may contain many component packets. In the case of an Attribute-Refinement database, a component packet could comprise and attribute description record 200 as one component and a constrain list 404 as another. Each attribute definition would correspond to a different component packet. A component packet could also comprise an attribute value array of FIG. 2C2 as one component and an entity list 602 as another. Each entity in the database would correspond to a different component packet.

A keyed search structure (or index), like a B+tree or a hash table, described extensively in the prior art, could be used to reduce the cost of locating a particular component packet. Each component packet could be associated with a key and stored in the keyed search structure. In the case of a component packet containing the attribute definition components, a keyed search structure would use the unique attribute id as the search structure key with the corresponding component packet as the associated data. In the case of a component packet containing the entity information a keyed search structure would use the unique entity id. A given database may contain may separate keyed search structures or may contain only one, depending on the uniqueness of the keys associated with each component packet.

FIG. 8B1 illustrates a B+tree leaf 820 containing a component packet 821. The key of the leaf entry is arbitrary. In the case of a B+tree of entities, the key would be entity identifier, and the component packet would comprise the attribute value array of FIG. 2C2 as one component and the entity list 602 as another. In the case of a B+tree of attribute descriptions, the key would be the attribute description identifier and the component packet would comprise an attribute description record 200 as one component and a constraint list 404 as another.

The size of the component packet may change as the entity lists 602 or constraint lists 404 are added to, in which case the B+tree algorithms would be invoked to maintain the B+tree size constraint so that no leaf block is less than one half full or greater than one logical block size. An increase in component packet size may cause the B+tree entry to move onto a leaf block with only one entry, as is illustrated by FIG. 8B2.

An entity list 602 could grow very large. For example, an entity representing an employer may have thousands of employee entity records whose joining attribute "salary" refers to the employer entity. In this case, the entity list 602 whose function is to support referential integrity would contain thousands of entity identifiers. When an employee entity is deleted, the corresponding employee entity list 602 must be updated to remove the deleted employee. In this circumstance, the component packet approach described above has two significant drawbacks. First, in order to locate and delete a particular entity identifier from an entity list 602, an arbitrarily large component must be transferred from the storage array 107 and modified. Second, the deletion of the entity identifier requires a linear search of an arbitrarily long list of identifiers.

Since the entity identifier list 602 contains unique entity identifiers, a keyed search structure, for example, a B+tree, may be created and keyed on entity identifier and with no data. Representing the entity identifier list 602 using a keyed search structure eliminates both drawbacks described above, due to the construction and function of keyed search structures like a B+tree. As well known and described in the prior art, (see, for instance, Comer, D., "The ubiquitous B-Tree", ACM Computing Surveys, Vol 11, 1979.), the root node of a B+tree contains all the search keys and associated data in the case where all the entries of the B+tree fit on one logical block.

Otherwise the root node contains one or more key/logical block number pairs. In other words, a B+tree root node may vary in size between approximately tens of bytes and the logical block size of the storage system. This implies that the entry point of this keyed search structure is always less than the logical block size of the storage system, and thereby reduces the amount of data that is transferred during the access of a particular key/data pair in the search structure. The cost of the access also is reduced due to the efficiencies of the search algorithms.

The entry point of the keyed search structure used to represent the entity list 602 may be stored as a data component in the component packet representing the entity record. In the case of a B+tree, the entry point consists of the root node, as described in the prior art. A search for a particular entity identifier would require the retrieval of the component containing the entry point, i.e. the B+tree root, and then would proceed with a B+tree search. Additions to the entity list would require additions to the B+tree, which may change the root node. In this case, the component packet manager would increase the size of the component containing the B+tree root node.

The combination of the component packet manager and components containing the entry point of a keyed search structure provides a general-purpose storage organization that has applications whenever storage of multiple, related, variable sized data elements is required. Any keyed search structure may be used, as long as the search structure reduces to an entry point requiring less than a logical block size of storage space when the number of elements falls below a particular threshold. The B+tree satisfies this requirement. Each component packet comprising the multiple, related, variable sized data elements may be keyed arbitrarily and stored in a B+tree. Conversely, the component packet may contain multiple B+tree root node components, which may themselves contain nested, arbitrarily keyed component packets.

Figure 9:
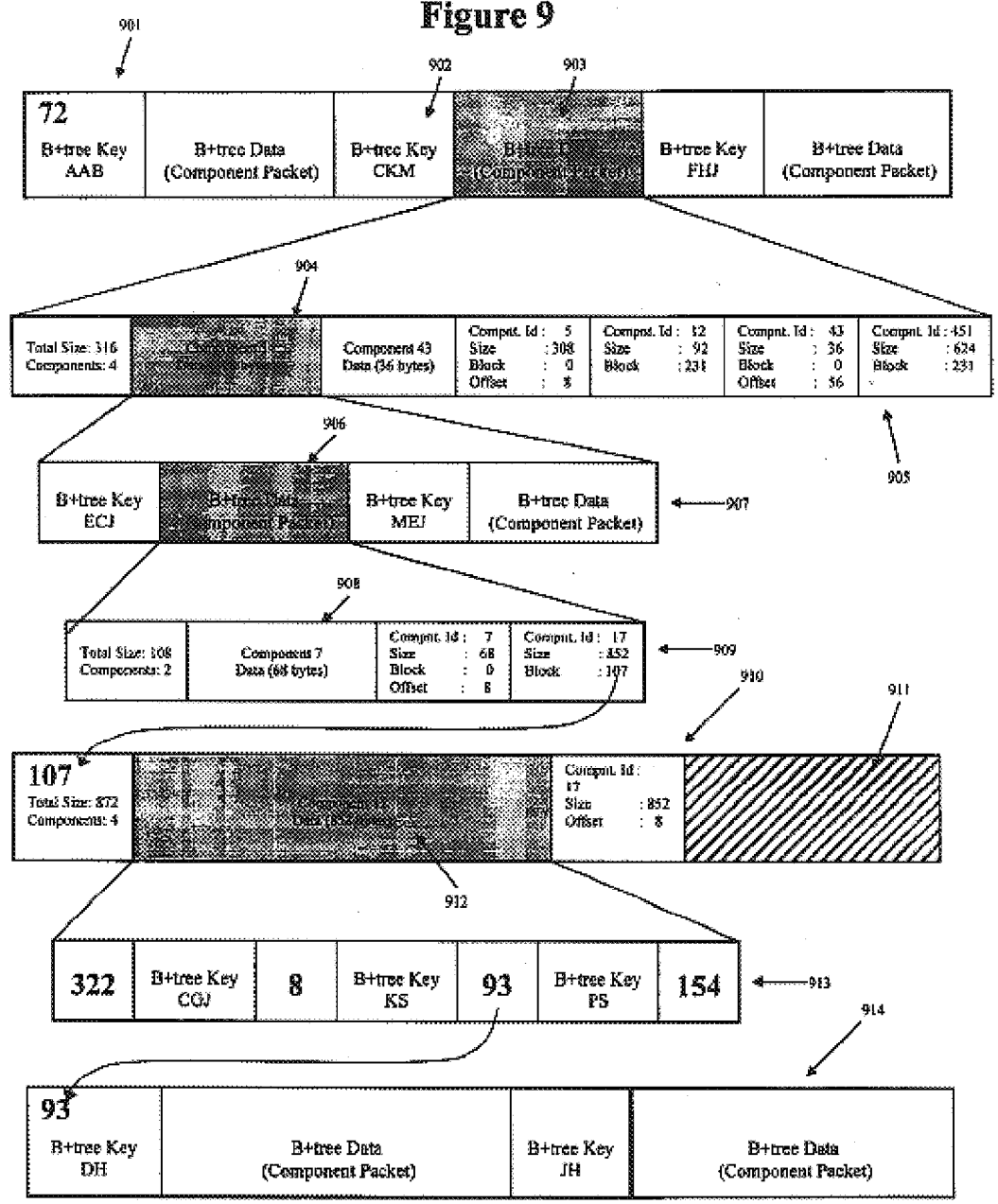
FIG. 9 illustrates interactions between the FIG. 8 component packet structure and method and a B+tree structure and method, in accordance with principles of the present invention.

FIG. 9 illustrates the interactions between the component packet structures and method and B+tree leaves, nodes and root nodes. A B+tree leaf 901 residing at logical block 72 in the storage array comprises three keys and associated data. The data associated with key 902 comprises a component packet 903, whose internal structure is illustrated by 905. Component data 904 for component with identifier 5 residing within component packet 903 comprises a B+tree root node 907. The B+tree corresponding to root node 906 contains only two entries, and in accordance with the prior art, the B+tree root node is therefore a leaf node containing both the key and data associated with the two entries. The data associated with the first leaf entry 906 comprises another component packet, whose internal structure is illustrated by 909.

The component packet 909 contains a component with identifier 17. The data corresponding to this component resides on the component block packet 910 located on logical block 107 in accordance with the component packet methods described above. In this example, the component block packet 910 does not utilize all of the storage space available on logical block 107, resulting in an unused portion indicated by 911.

The component with identifier 17 belonging to the component packet 909 contains data 912 representing a B+tree root node for yet another B+tree. The structure of this B+tree root node is illustrated by 913. The B+tree root node is an internal node, and as a result follows the form of B+tree internal nodes described by the prior art. Internal B+tree nodes consist of key, logical block number pairs, with one additional block number per internal node. The third logical block number in the internal node refers to a B+tree leaf block 914 residing on logical block 93, which contains a B+tree leaf 913 similar in structure to 901.

FIG. 9 provides an illustration the behavior of the component packing algorithm when combined with component data comprising B+tree root nodes. A B+tree leaf entry (i.e. 906) may contain component packets (i.e. 909). Small B+tree root nodes (i.e. 907) may be stored within a component packet (i.e. 903), which itself resides in the leaf entry of another, unrelated B+tree leaf (i.e. 901). As a result, a single storage array access, in this case of logical block number 72, retrieves the data for all the components and B+tree entries for the B+tree leaf 901, the component packet 903, the nested B+tree 907, and the component packet 909 contained therein.

As a B+tree accumulates more entries, the B+tree root will transition from a leaf format (i.e. 907) to an internal node format (i.e. 913), in accordance with the prior art. Once the root node size exceeds one half the logical block size of the storage array, the component packing method described above will store the root node component on a component block packet (i.e. 910), while leaving smaller components in the component packet itself (i.e. the component with identifier 7 of component packet 909).

An increase in the size of a nested component, for example 908, cannot be accomplished without first increasing the size of the first B+tree data entry of 907. This in turn cannot be accomplished before increasing the size of component 904 of component packet 905. An increase in component 904 first requires an increase in the size of the second B+tree entry 903 of leaf 901. An increase in a B+tree leaf entry may result in the splitting of that leaf, in accordance with the prior art.

The sequence of component packet and B+tree entry size changes, e.g. increase the size of each enclosing B+tree entry before increasing the component's size, is a consequence of component packing method described above, specifically the steps described as shifting component data and component directory record entries. Decreasing the size of any nested component is accomplished by first decreasing the size of the nested component, and then adjusting the size of the enclosing B+tree entry.

The combination of the component packing method and a keyed search structure, called the OTree clustering and storage method, provides a general purpose data clustering and retrieval method having benefits including: the property that all the components whose combined size is less than a logical block size will reside on the logical block containing the component packet and will therefore only require one storage array access for retrieval; the property that components whose combined or individual size exceed a logical block will require at most one additional storage array access, in short, the property that the number of storage accesses rises proportional to the size of the component; a minimum storage utilization of roughly 50%; the property that component data may itself be further partitioned into keyed data elements or keyed (nested) component packets, where the clustering of the keyed data elements or nested component packets obeys the properties described above, and that the access, insertion or deletion of any keyed data element or nested component packet will benefit from the efficiencies of the keyed search structure algorithms.

The OTree clustering and storage method may be used as part of a client-server networked storage system. The OTree clustering and storage method is most preferably implemented within, and as a functional part of, a server. The client would be an application. When an OTree clustering and storage method is used in this configuration, two complementary properties provide a significant performance improvement. First, the access of any component packet requires at most one B+tree search. Second, a networked OTree clustering and storage system only requires a single network communication to send many data components, since the data components as retrieved by the B+tree search are already packed in a consecutive sequence of bytes. The first property reduces the computational load on a networked OTree clustering and storage system and the second property minimizes the network traffic between the OTree clustering and storage system and its client applications.

The A-R DBMS may apply the OTree clustering and storage method to the storage and retrieval of the various record structures described above. Specifically, the OTree clustering and storage method eliminates the drawbacks associated with other storage approaches for the entity record and it's the associated attribute value array and entity list 602 described above.

The OTree clustering and storage method may also be applied to the logical block 0 directory of record types by storing each record array illustrated in FIG. 7 as a B+tree component of a single component packet. Each record entry may be stored as keyed sub-entries of a component, with the unique identifier fields of each record described above serving as the key values.

While the present invention has been described with reference to particular embodiments, the description is only an example of the invention's application and should not be taken as a limitation. Various adaptations and combinations of features of the embodiments disclosed are within the scope of the invention as more particularly defined by the following claims.

I claim:

1. A computer-based software method for creating and modifying a data base comprising a multiplicity of records, the method comprising the steps of:
   (a) creating a database comprising a plurality of entity records and a schema which further comprises a plurality of attribute records further comprising an attribute schema, and a plurality of constraint records, wherein each constraint record further comprises a logical statement that can be used to describe the circumstances under which an attribute value is allowed in a corresponding entity and if so, any limitations on the attribute value;
   (b) inputting data into one or more attribute records, into one or more constraint records, and into one or more entity records;
   (c) deleting data in one or more of the attribute records, in one or constraint records, and into one or more entity records; and
   (d) storing the records of the database in a computer storage medium, so that the attribute schema of any of the records may be modified without requiring reloading either part or all of the database to maintain its integrity.

2. The method of claim 1, wherein each entity record further comprises a unique identifier and a list of pairs of attribute identifiers and associated values, and wherein each attribute further comprises a unique identifier and an associated data type.

3. The method of claim 2, wherein each constraint record further comprises a statement which evaluates to true or false when applied to an entity record in the database.

4. The method of claim 3, wherein each attribute record comprises an attribute description which further comprises a unique identifier and an associated data type.

5. The method of claim 4, wherein each attribute descriptor further comprises the functionality to include a joining attribute.

6. The method of claim 5, wherein each attribute descriptor further comprises the functionality to include a repeatability attribute.

7. A computer-based system for creating and modifying a data base comprising a multiplicity of records, the system comprising:
   (a) a database comprising a plurality of entity records and a schema which further comprises a plurality of attribute records and a plurality of constraint records, wherein each constraint record further comprises a logical statement that can be used to describe the circumstances under which an attribute value is allowed in a corresponding entity and if so, any limitations on the attribute value;
   (b) means for inputting data into one or more attribute records, into one or more constraint records, and into one or more entity records;
   (c) means for deleting data in one or more of the attribute records, in one or more constraint records, and into one or more entity records; and
   (d) means for storing the records of the database in a computer storage medium, so that the attribute schema of any of the records may be modified without requiring reloading either part or all of the database to maintain its integrity.

8. The system of claim 7, wherein each entity record further comprises a unique identifier and a list of pairs of attribute identifiers and associated values, and wherein each attribute record further comprises a unique identifier and an associated data type.

9. The system of claim 7, further comprising a database management system, which comprises:
   (a) an application interface;
   (b) one or more user application programs each connected to the application interface;
   (c) an entity manager connected to the application interface, and to the database records;
   (d) an entity validator connected to the entity manager;
   (e) a constraint manager connected to the entity validator, and to the database records;
   (f) an attribute description manager connected to the constraint manager, to the entity validator, and to the database records; and
   (g) means for searching the data base, connected to the database and to the application interface,
   providing means to create, modify, and display the database.

10. The system of claim 8, wherein each constraint record further comprises a statement which evaluates to true or false when applied to an entity record in the database.

* * * * *